United States Patent Office 2,758,911
Patented Aug. 14, 1956

2,758,911

PREPARATION OF ALKALINE EARTH METAL TITANATES

Langtry E. Lynd, South Plainfield, N. J., and Leon Merker, Bronx, N. Y., assignors to National Lead Company, New York, N. Y., a corporation of New Jersey No Drawing. Application March 16, 1956, Serial No. 571,895

5 Claims. (Cl. 23—51)

This invention relates to novel alkaline earth metal titanate compositions of matter especially adapted for use as dielectric material or as a starting material for the preparation of single crystals of alkaline earth metal titanates.

In preparation of single crystals or dielectric material in general, it is necessary to employ a raw material which conforms to necessary requirements, such as for example, purity and particle size. In preparing the various raw materials for making single crystals it is difficult to obtain the high quality demanded for single crystal production. Alkaline earth metal titanates are normally prepared by calcining a mixture of titanium dioxide and alkaline earth metal carbonate at elevated temperature. The type of titanate produced by this method however is not of sufficient purity to be used as raw material for single crystal production even though C. P. grade (chemically pure) raw materials, which are the purest commercially available, are employed. The C. P. grade raw materials invariably have quantities of alkali metal and alkaline earth metal compounds present which apparently cannot be conveniently or readily removed. When produced by calcining titanium dioxide and a carbonate of alkaline earth metals, the titanate usually is not homogeneous and therefore varies from the theoretical composition throughout the mass. Furthermore this type of material does not possess the necessary particle size for single crystal production.

An object of this invention therefore is to provide an alkaline earth metal titanate composition which is capable of being used as raw material in forming titanate single crystals. A further object is to provide a simple method for the production of high quality alkaline earth metal titanate composition which may be used as dielectric material. Another object is to provide a method by which barium, strontium or calcium titanate of extraordinary purity may be produced from commercially available raw materials which will be suitable for production of single crystals. Another object is to provide a product which has a relatively high bulk density which possesses good free-flowing characteristics. These and other objects will become apparent from the following more complete description of the present invention.

In its broadest aspects this invention contemplates a method for preparing finely divided alkaline earth metal titanates of a character adapted for the manufacture of dielectrics and single crystals. Such a composition will comprise a free-flowing finely divided substantially pure, substantially uniform titanate of alkaline earth metals which is formed by calcination of an aqueous hydrolysate and is characterized by an ultimate unit particle size between about 0.1 and 1.0 micron, a majority of said particles being present in aggregated form, the aggregates being of size to pass through 100 mesh screen. Such material will have a high bulk density, for example, between 40 and about 60 lbs. per cubic foot. The method of the instant invention for producing substantially pure alkaline earth metal titanates comprises first forming alkaline earth metal titanium oxalate and subsequently calcining this compound until the oxalate values are destroyed and the alkaline earth metal titanate composition is obtained.

This invention also contemplates the preparation of mixed alkaline earth metal titanate compositions. In the preparation of such mixtures two or more of the alkaline earth titanates, for example, barium and strontium titanate, may be prepared by admixing the respective chlorides together and preparing a mixed precipitate of barium and strontium titanium oxalate which is subsequently calcined to produce the mixed titanate.

In preparing this composition it is preferred to precipitate the alkaline earth metal titanium oxalate by admixing in solution titanium oxalate and an alkaline earth metal chloride. The precipitate should be washed thoroughly, preferably with distilled water, until the filtrate is free from soluble chlorides. The titanium oxalate solution may initially be prepared by reacting a titanium tetrachloride solution with oxalic acid.

The calcination of the alkaline earth metal titanium oxalate composition is not critical except for obtaining at least a minimum temperature which will substantially completely destroy the oxalate values from the composition. It has been found that a minimum temperature of about 550° C. is necessary to destroy the oxalate values.

By such a process barium, strontium and calcium titanate or mixtures thereof may be produced. In order to obtain higher efficiencies in the recovery of the calcium titanate values, it has been found in the instant invention that it is desirable to employ acetic acid during the precipitation of the calcium titanium oxalate. The presence of acetic acid apparently lowers the solubility of the calcium titanium oxalate and therefore better recoveries are obtained.

By the use of this method, satisfactory purity of the alkaline earth metal titanate has been obtained when employing C. P. grade (chemically pure) raw materials. Certain impurities, particularly the alkali metal, usually are present in excess of the tolerable amount in most C. P. materials, but the excess is readily removed during the precipitation and washing of the alkaline earth metal titanium oxalate. This method produces substantially pure alkaline earth metal titanate from C. P. grade raw materials while the prior art methods cannot produce substantially pure titanates from such commercially available high grade materials. A soft calcined product is obtained and when it is screened through 100 mesh screen it possesses good free-flowing properties. Such material is readily adaptable for the manufacture of either titanate dielectrics or single crystals.

The bulk density of the calcined alkaline earth metal titanate product was determined on a Scott volumeter. This procedure is described in detail on page 145 in "1949 Book of A. S. T. M. Standards," part 4.

Other compounds may be added in small quantities as modifying agents during the process in order to produce desired effects in the final product. Such modifying agents may alter, for example, the electrical properties of the titanate without substantially changing its physical characteristics.

In order to more fully illustrate the instant invention, the following examples are presented:

EXAMPLE 1

Preparation of barium titanate from barium titanium oxalate

In order to prepare barium titanate the following procedure was used: Titanium tetrachloride was reacted with oxalic acid to produce titanium oxalate. The titanium oxalate was then reacted with barium chloride to form barium titanium oxalate. The barium titanium oxalate was then calcined to produce barium titanate.

The titanium tetrachloride solution was prepared by slowly adding a substantially pure titanium tetrachloride to distilled water. 2,000 parts of distilled water were placed in a tank equipped with an agitator and cooling coils. 1,000 parts of titanium tetrachloride were slowly added to the distilled water over a one hour period. The temperature during the titanium tetrachloride addition was held below 30–35° C. and at the end of titanium tetrachloride addition the solution was perfectly clear and free from hydrolyzed $TiO_2$. The solution was then cooled to room temperature. The solution contained about 185 grams per liter of titanium calculated as $TiO_2$.

The oxalic acid solution was prepared by dissolving oxalic acid crystals in distilled water. 3,200 parts of C. P. grade oxalic acid ($H_2C_2O_4 \cdot 2H_2O$) were added to 6,800 parts of distilled water. The mixture was heated to 70–75° C. to speed up the dissolving time. The solution was then transferred to another container and allowed to cool to about 65° C.

In order to produce the titanium oxalate solution, 4,500 parts of the previously prepared titanium tetrachloride solution were added to the oxalic acid solution and the mixture was well stirred with a mechanical agitator.

A solution of barium chloride was prepared by dissolving 2,150 parts of C. P. grade barium chloride ($BaCl_2 \cdot 2H_2O$) in 4,500 parts of distilled water. The mixture was heated to 70–75° C. to speed up the solubilization. The solution was then cooled to 65° C.

The barium chloride solution was added slowly to the titanium oxalate solution at 65° C. forming a heavy white precipitate of barium titanium oxalate. The mixture was rapidly agitated during the addition of the barium chloride solution and was stirred for ½ hour after all of the barium chloride solution had been added. The precipitate of barium titanium oxalate was allowed to settle until it occupied about ⅓ of the volume of solution. The precipitate was then filtered on a vacuum filter and the filter cake was washed with cold water until the wash liquor was free from chlorides. The filter cake was then air dried for 4 hours.

The dried cake was calcined at 900° C. for 3 hours to destroy the oxalate values and to form barium titanate. The calcined material weighed 1811 parts which represents 97% recovery of the titanium values. The product analyzed 34.0% of $TiO_2$, 65.7% BaO, <0.1% alkali metal oxides, <0.1% alkaline earth metal oxides and 0.08% silica. An X-ray of the final product showed only barium titanate pattern. The calcined barium titanate material was screened through a 100 mesh screen and the size of the aggregates was found to be as follows:

|       | Sieve Size  | Percentage |
|-------|-------------|------------|
|       | +100 mesh   | 0          |
| −100  | +150 mesh   | 20.5       |
| −150  | +200 mesh   | 40.1       |
| −200  | +250 mesh   | 16.8       |
| −250  | +325 mesh   | 12.2       |
| −325  |             | 10.4       |
|       |             | 100.0      |

Substantially all of the individual particles fell within the range between 0.1 and 0.6 micron. The bulk density of this material was 50 lbs. per cubic foot. The product was free-flowing.

A single barium titanate crystal was prepared by the thermal gradient method from the barium titanate produced in this example.

EXAMPLE 2

*Preparation of strontium titanate from strontium titanium oxalate*

The same general procedure was used in this example as that described in Example 1 except strontium chloride was used in place of barium chloride.

The titanium oxalate solution was prepared in the same manner as described in Example 1.

A solution of strontium chloride was prepared by dissolving 2,350 parts of C. P. grade strontium chloride ($SrCl_2 \cdot 6H_2O$) in 4,800 parts of distilled water. The mixture was heated to 70–75° C. to speed up the solubilization. The solution was then cooled to 65° C.

The strontium chloride solution was added slowly to the titanium oxalate solution at 65° C. forming a heavy white precipitate of strontium titanium oxalate and was processed, filtered and washed using the method described in Example 1.

The dried precipitate was then calcined at 900° C. for 3 hours to destroy the oxalate values and to form strontium titanate.

The calcined material weighed 1,296 parts which represents 88% recovery of the titanium and strontium values. The product analyzed 43.6% $TiO_2$, 56.3% SrO, <0.1% alkali metal oxides, <0.1% alkaline earth metal oxides, and 0.08% silica. An X-ray of the final product showed only strontium titanate pattern. The product was satisfactory for preparation of single crystal strontium titanate. The physical characteristics of this strontium titanate material were similar to the barium titanate described in Example 1.

EXAMPLE 3

Calcium titanate was prepared in the following manner. Titanium tetrachloride was reacted with oxalic acid to produce titanium oxalate. The titanium oxalate was then reacted with calcium chloride to form calcium titanium oxalate. The calcium titanium oxalate was then calcined to produce calcium titanate.

The titanium tetrachloride solution and the oxalic acid solution were prepared according to the procedure described in Example 1.

In order to produce the titanium oxalate solution, 373 milliliters of the previously prepared titanium tetrachloride solution and the oxalic acid solution were admixed at 45° C. and the mixture was well stirred with a mechanical agitator.

A solution of calcium chloride was prepared by dissolving 156 grams of C. P. grade calcium chloride ($CaCl_2 \cdot 2H_2O$) in 2,000 milliliters of distilled water. The temperature of the solution rose to 31° C.

The calcium chloride solution was added slowly to the titanium oxalate solution at 40° C. to 45° C. and upon cooling formed a heavy white precipitate of calcium titanium oxalate. The agitation was continued for about 3 hours at which time the mixture was cooled to room temperature. The precipitate of calcium titanium oxalate was allowed to settle for about 2 hours and was then filtered on a vacuum filter and the filter cake was washed with cold water until the wash liquor was free from chlorides. The filter cake was then air dried and was calcined at 1050° C. for 2 hours to destroy the oxalate values and to form calcium titanate. The calcinated material weighed 98 grams which represents 82% recovery of the titanium values. The product analyzed 58.6% of $TiO_2$, 41.1% CaO, <0.1% alkali metal oxides, <0.1% alkaline earth metal oxides and 0.08% silica. An X-ray of the final product showed only calcium titanate pattern. The calcined calcium-titanate material was screened through a 100 mesh screen.

Substantially all of the individual particles fell within the range between 0.1 and 1.0 micron. The bulk density of this material was 50 lbs. per cubic foot. The product possessed good free-flowing characteristics.

A single calcium titanate crystal was prepared by the flame fusion method from the calcium titanate produced in this example.

EXAMPLE 4

In order to obtain higher yields of calcium titanate the same procedure as described in Example 1 was used except that acetic acid was employed in the mixture during the precipitation of the calcium titanium oxalate. In this example 373 milliliters of the titanium tetrachloride solution and the oxalic acid solution were admixed with stirring at a temperature of 45° C. While continuing the agitation the calcium chloride solution was added followed by the addition of 520 milliliters of glacial acetic acid. The precipitate formed upon cooling and after about 3 hours' agitation and cooling, the precipitate was allowed to settle for about 2 hours and was then filtered, washed and calcined at 1050° C. for 2 hours. The amounts of reagents employed in the precipitation were substantially identical to those described in Example 3 except that acetic acid was added during the precipitation of the calcium titanium oxalate.

The calcined material weighed 117 parts which represents 98% recovery of the titanium and calcium values. The product analyzed 58.7% $TiO_2$, 41.0% CaO, <0.1% alkali metal oxides, <0.1% alkaline earth metal oxides, and 0.08% silica. An X-ray of the final product showed only calcium titanate pattern. The product was satisfactory for preparation of single crystal calcium titanate. The physical characteristics of this calcium titanate material were similar to those described in Example 3.

EXAMPLE 5

*Preparation of mixed barium and strontium titanates*

The same general procedure was used in this example as that described in Example 1 except a mixture of strontium chloride and barium chloride was used in place of barium chloride. The titanium oxalate solution was prepared in the same manner as described in Example 1.

The mixture of barium and strontium chloride solution was prepared by dissolving 303 grams of $BaCl_2 \cdot 2H_2O$ and 186 grams of $SrCl_2 \cdot 6H_2O$ in 860 milliliters of water at 80° C.

The titanium oxalate solution was prepared by adding 684 milliliters of a titanium tetrachloride solution of the same concentration as used in Example 1, to a solution containing 638 grams of $H_2C_2O_4 \cdot 2H_2O$ dissolved in 1360 milliliters of water at 80° C.

The mixture of barium and strontium chloride solution was added rapidly to the titanium oxalate solution at 80° C. forming a heavy white precipitate of barium and strontium titanium oxalate and was processed, filtered and washed according to the method described in Example 1. The dried precipitate was then calcined at 1000° C. for two hours to destroy the oxalate values to form the mixed barium and strontium titanate. An X-ray examination of the final product showed a solid solution of barium and strontium titanate.

The type of product produced by the instant process is finely divided and homogeneous and has the characteristics of being free-flowing. An average particle size of the alkaline earth metal titanate product lies between 0.1 micron and 1.0 micron. Substantially all of the individual particles are present in the form of aggregates which pass through a 100 mesh screen. The bulk density lies between about 40 and about 60 lbs. per cubic foot. In order to be useful, particularly for the manufacture of single crystals the material must possess good free-flowing properties, high bulk density, small individual particle size, and substantially all of the particles in aggregated form. Such characteristics are essential in the material to be employed for the manufacture of dielectrics and particularly single crystals. This titanate product has been prepared from raw materials which normally are not sufficiently pure to produce a substantially pure titanate product.

This application is a continuation-in-part of our co-pending applications Serial No. 348,812, filed April 14, 1953, and Serial No. 373,879, filed August 12, 1953.

While this invention has been described and illustrated by the examples shown, it is not intended to be strictly limited thereto and other modifications and variations may be employed within the scope of the following claims.

We claim:

1. Preparation of finely divided alkaline earth metal titanate which comprises admixing a titanium oxalate solution and an alkaline earth metal chloride solution to precipitate an alkaline earth metal titanium oxalate, filtering and drying said precipitate and calcining at elevated temperatures until the oxalate values are destroyed and the alkaline-earth metal titanate compound is obtained.

2. Method according to claim 1 in which said alkaline earth metal is barium.

3. Method according to claim 1 in which said alkaline earth metal is strontium.

4. Method according to claim 1 in which said alkaline earth metal is calcium.

5. Preparation of finely divided calcium titanate which comprises admixing titanium oxalate solution, a solution of calcium chloride and acetic acid to precipitate calcium titanium oxalate, filtering and drying said precipitate and calcining at elevated temperatures until the oxalate values are destroyed and a finely divided titanate composition is obtained.

No references cited.